Nov. 9, 1937.  W. W. ROWE  2,098,258
PROCESS OF MAKING ADHESIVELY SECURED SEAMED STRUCTURES
Filed Dec. 13, 1932

INVENTOR.
William Wallace Rowe
BY Allen & Allen
ATTORNEYS.

Patented Nov. 9, 1937

2,098,258

UNITED STATES PATENT OFFICE 2,098,258

PROCESS OF MAKING ADHESIVELY-SECURED SEAMED STRUCTURES

William Wallace Rowe, Cincinnati, Ohio, assignor to The Paper Service Company, Lockland, Ohio, a corporation of Ohio Application December 13, 1932, Serial No. 647,000

11 Claims. (Cl. 229—62)

My invention is addressed to the making of adhesively-secured seams, and to the making of treated and protected structures which facilitate the making of adhesively-secured seams. More particularly my invention is addressed to structures and processes wherein members are joined together by the autogenous adhesion of prepared surfaces. My invention is not limited to any particular character of seamed or laminated structure, and is applicable in general to the making of structures wherein webs or laminae of different sorts including, but without limitation, webs of felted fibers, textile structures, woven fabrics, paper, etc., are joined to the same or dissimilar webs, or surfaces of materials not in web form. Hereinafter I shall not refer particularly to the character of the webs excepting insofar as may be necessary to the understanding of certain exemplary, but not limiting embodiments of my invention, which I shall hereinafter set forth for the sake of making an adequate disclosure. The character of the seamed structure formed is likewise not a limitation upon my invention. I shall describe my invention in connection with the manufacture of a seamed article in which the utility of my invention is realized in a very great degree, namely, in the manufacture of bags, and more particularly in the closing of bags after they have been filled, it being understood that my invention is equally applicable to seamed structures of many other kinds including, but without limitation, containers, formed covers, tarpaulins, protective coverings for objects, and to the production of laminated fabrics in general.

It is my object to produce structures in which adhesively-secured seams may readily be effected by simple procedures involving usually merely the step of bringing the surfaces to be secured into contact, with such pressure as may be found desirable. It is also my object to produce coated structures capable of adhering one to another, or to another prepared surface, upon being brought into contact. It is another of my objects to produce adhesively-secured seams which are very strong, but which employ a minimum amount of adhesive substance. It is further my object to produce treated structures which are protected from deleterious external influences until such time as actual adhesion one to another is required.

As aforesaid, I shall describe my invention primarily in connection with those problems which arise in the production of adequate top closures in filled bags, this description being of an embodiment of my invention which is exemplary merely. The objects set forth hereinabove and other objects of my invention which will be set forth hereinafter, or will be apparent to one skilled in the art upon reading these specifications, I accomplish by that certain construction and arrangement of parts and by that process of which I shall now describe the aforesaid exemplary embodiment. Reference is made to the accompanying drawing wherein;

Figure 1:
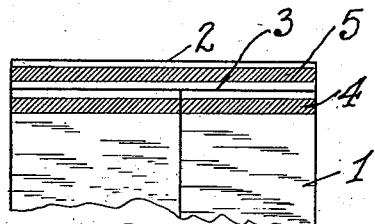
Figure 1 is a plan view of the top of a bag structure illustrating one embodiment of my invention.

In the practice of my invention, I coat webs, at least over portions thereof which are to be joined together, with a coating of adhesive substance which retains permanently an adhesive character at least to another prepared surface, or retains such adhesive character for a sufficient length of time to permit the manufacture of the completed article at a point of time remote from the point of time of coating or treating. In this way I produce, where the structure is a container, a self-sealing device; and in other instances, I facilitate the production of seams as they may be needed in the manufacture of the article, or in adapting the article to any particular use to which it may be put.

The adhesive I employ is preferably, for reasons which will hereinafter be made apparent, an adhesive which is adapted to stick to itself preferentially in its ultimate condition rather than to other substances. The adhesive is also preferably one which can be protected by a cover strip or the like, which is cleanly and readily removable therefrom. The adhesive which I have found most suitable for my purpose is a rubber latex or other composition which does not have such a proportion of curing agents, if any, as will cause the material to set up to a permanently non-tacky condition, at least to my prepared surfaces. Rubber latex is also especially advantageous in this, that it fully meets the requirements of an adhesive which initially is adapted to adhere to various substances quite readily, but sets to a condition in which it is relatively non-adhesive to other substances but extremely adhesive to another set up layer of rubber latex. Rubber latex is an aqueous emulsion in its initial form, and readily adheres to various surfaces, such as those of cloth, textile and felted structures, wood, plaster and cement. When the water has been expelled or dried therefrom, however, the rubbery materials in the latex set up to form a continuous elastic and stretchable layer which is relatively less adhesive to other materials, but is extremely adhesive to another layer of rubbery material. Finally, latex and other rubbery materials have the further advantage of being relatively less adhesive to certain surfaces, usually of an impervious type, such as the surfaces of glass, metal, treated papers, Cellophane, parchment, glassine, and acetates, nitrates and other cellulosic compounds, whether applied to these surfaces wet or dry. This quality enables me to employ cover strips of such substances which will protect the set up adhesive layer from external influences, but are readily removable therefrom.

In the manufacture of bags, the matter of forming a top closure by adhesive means after the bag has been filled presents considerable problems. If the bag is to be closed by the turning over of an integral or separate closure flap, or by the employment of a top edge binding strip or the like, it is necessary to coat the several surfaces, or some of them, with an adhesive to position the surfaces as desired in forming the seam, and to retain this position until the adhesive has set to a satisfactorily strong condition. In closing large numbers of bags, paricularly by mechanism, there are serious problems to be overcome in positioning and maintaining the position of the parts as well as in the application of adhesive. Furthermore, in sealing waterproof bags containing hygroscopic or deliquescent materials it is undesirable to use a cement containing moisture. My invention does not present these problems for the reason that after the bag is filled it is merely necessary to press the parts together, whereupon they will adhere with suitable strength. Bags are frequently filled with powdered substances or substances likely to give off powder which would collect upon the surfaces of the adhesive and tend to render them non-adhesive, or to diminish the strength of the bond. In the practice of my invention, depending upon the structure being made, I protect the adhesive from such deleterious external influences either by the material itself to which adhesive is applied, or, as is most usually the case, by a cover strip of the character hereinabove mentioned. The adhesive is thus protected from dust, and, where desired, from light and air, so that its adhesive power is unimpaired when it is ultimately exposed.

By the use of preapplied layers of adhesive, a layer being applied to each of the surfaces to be joined, I secure the advantage of the ready adhesion of the adhesive layers to each other, and by reason of this ready and very strong adhesion I am enabled to use less of the adhesive substance than would otherwise be necessary. Thus, in the manufacture of bags I can provide a top closure which can be made by bringing two treated surfaces together under pressure, and without the application either of adhesive or of solvent at the time of closing the bags. Of course, if it is desired to apply a fresh coat of adhesive or solvent to either of the surfaces, such fresh coat need not be very thick because of the presence of the previously applied coats. A signal advantage of my invention is the instantaneous adhesion of the prepared surfaces which I have described; and in bag closing operations, for example, there is no necessity to wait for the drying or setting of an adhesive. Furthermore the bond is more sure than with fresh applications to one surface only, where there is no adhesion if the cement dries when not in contact with both surfaces. I have found that rubber latex, as described, and other uncured rubbery substances, retain the property of instantaneous adhesion to like substances practically indefinitely.

Bags having top closure structures in accordance with my invention, fall into two general classes: (a) bags having an integral lip or a properly attached sealing flap adapted to fold across the mouth and lap over on the other wall of the bag; (b) bags having both walls adjacent the mouth treated so that a separate treated strip can be adhered around the mouth of the bag. In this case such a separate strip may, and preferably will be fed from a continuous roll and cut apart into separate closure elements as required. I shall describe several exemplary bag structures to illustrate the employment of my invention in connection with the closures thereof.

Referring to Fig. 1, I have shown a bag having a body 1 and an integral closing flap 2. The actual mouth of the bag is indicated at 3. On the wall of the bag, as at 4, and upon the flap 2, as at 5, I position layers of adhesive material as aforesaid. When such a bag is filled it is merely necessary to fold over the sealing flap 2 and to press it against the body of the bag, whereupon the adhesive layers 4 and 5 instantly bond.

Figure 2:
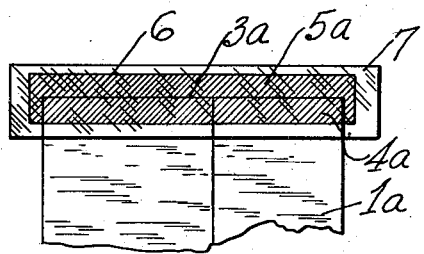
Fig. 2 is a plan view of the top of another bag differing from the bag of Fig. 1 in that the so-called sealing flap is not integral with the bag body. This figure also shows the treated sealing surfaces on the bag protected by a suitable covering, as will hereinafter be set forth.

In Fig. 2 the bag body 1a, having the mouth line 3a, has attached to it a partly adhered separate closing flap 6. Layers of rubber latex 4a and 5a have been placed upon the upper edge of the body and the projecting part of the sealing flap. A cover strip 7, of Cellophane, parchment paper, cellulose acetate, glazed holland, or the like, has been pressed into contact with the layers 4a and 5a of the adhesive, to which it adheres sufficiently to be retained in position. The protective strip is slit along the line 3a of the bag mouth to permit the filling of the bag, or two may be employed if desired. It is left in position while the bag is filled, thereby protecting the adhesive. When the filling of the bag has been completed, the protecting strip 7 (which preferably extends beyond the end or edge of the sealing flap or adhesive area for this purpose) is grasped and removed by peeling it from the adhesive surface, whereupon the projecting portion of the sealing flap 6 is folded over on the bag body and pressed thereagainst to complete the closure. It will also be noted that I have shown the sealing flap 6 extending beyond the side edges of the bag body. When the flap is folded over upon the body, the ends of it extending therebeyond will adhere together, thus forming an impervious and sift-proof closure at the corners as well as along the mouth.

It may be pointed out that another advantage of my procedure and structure flows from the drying of the adhesive prior to the filling of the bag. Thus, where material is being shipped, which is susceptible to moisture, it will not be affected by moisture drying out of the adhesive, nor will food products be contaminated by the fumes of a solvent or the like.

Figure 4:
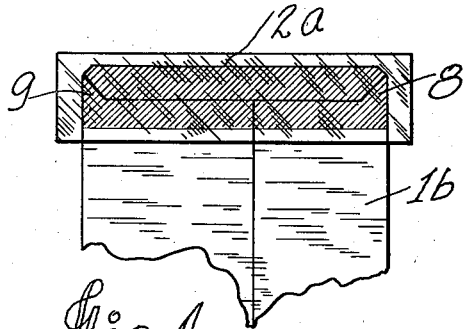
Fig. 4 is a view of the top of a bag comparable to Fig. 2, and showing a structure having an integral sealing flap and provision for the making of an impervious closure.

In Fig. 4 the sealing flap 2a is integral with the bag body 1b, which body is joined to the flap by tapering edge portions 8 and 9 adapted to fold over upon themselves in the sealing operation, thus giving an impervious and moisture-tight structure.

Figure 8:
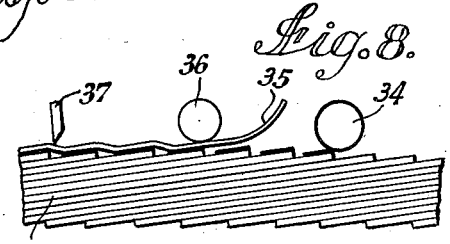
Figure 8 is illustrative of the steps of a special process of preparing bags for sealing.

In the formation of bags of this character, the application of latex may be made in a number of ways. I have found it very convenient, whether dealing with bags having integral sealing flaps, as in Figs. 1 and 4, or with bags having sealing flaps already partially attached thereto, to arrange these bags fanwise as shown at 33 in Figure 8 so as to expose only such portions thereof as are to receive the adhesive. I then apply the adhesive by rolls 34, by spraying, or by painting, to the exposed portions of all of the bags. I may immediately cover such coated portions with a continuous piece of the protective substance 35, pressing it into place as at 36, afterward cutting this protective substance to separate the bags, and slitting it at the mouth of each bag to permit the filling thereof, by the use of the knife 37. Other methods of applying and protecting the adhesive are, of course, comprised in the scope of my invention.

In the formation of cemented seams in bags by methods hitherto practiced it has been important not to allow the adhesive to extend beyond the lapped portions of the bags, since prior to the setting of the adhesive, the bags would tend to stick to other bags in a stack, or to adhere together within. In my structures and process, there is a distinct advantage in preparing the surfaces beyond the line of intended lap. Adhesion to external objects or the undesired adhesion of bag parts is prevented either by drying out of contact with other parts, or by the protective cover strip. Running the adhesive beyond the line of intended lap insures the sticking of the parts out to the very edge, whereby peeling action is inhibited.

Moreover the drying of the adhesive prior to the actual lapping and bonding of the parts is highly advantageous in this: that whereas the moisture is partially dried or undried adhesive tends to weaken paper or the like so that any strain on the parts may cause separation of the paper; when the adhesive has been first dried and set, there are no weakened parts, and the instant adhesion in the joint is effected between parts of full strength.

It will be evident that my closure method and structure is applicable not only to bags of paper, but also to burlap, cotton, and paper lined burlap or cotton bags. Where a textile material or composite material of paper and textile is employed, it is preferable to adopt a seam construction which will permit the adhesive union of textile to textile; but this is not a limitation upon my present invention, which may likewise be applied to all of the styles of adhesively secured seams employed in bags or other seamed structures.

Figure 3:
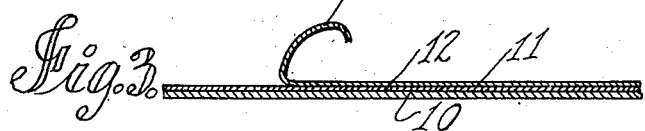
Fig. 3 is a sectional view of a web coated with adhesive and protected by a protecting substance or layer, the said layer being partially removed to expose the adhesive.

I have shown in Figure 3 a fabric 10 bearing an adhesive coating 11, which is covered by a protective strip 12, and I have shown the protective strip partially peeled away from the coating, as at 13. The material of the protective covering strips will preferably be cheap and relatively less adherent to the coating than is the web or body to which said coating is applied, though sufficiently adherent thereto to remain detachably secured to the coating. It will also be strong enough so that it can be stripped from the treated surface readily. It is possible to use creped protective strips. The creping reduces to a useful degree the possibility of tearing the strip in removal, since the strip tends to let go crepe by crepe.

Figure 5:
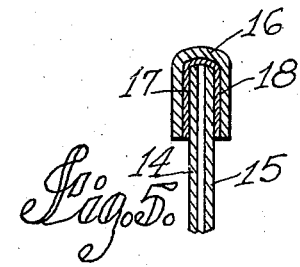
Fig. 5 is a sectional view of the top closure of a bag which may be formed from the structures shown in Figs. 2 and 4, but may also be formed by the complete application of a separate strip after the filling of the bag.

In Figure 5 I have shown in cross-section a bag having body walls 14 and 15 sealed by a closure strip 16, which is passed completely about the mouth of the bag and is held by combined layers of adhesive 17 and 18 to the bag walls. If it is desired to use a separate closing strip in the closing operation, the walls adjacent the mouth of the bag will be coated with the adhesive, and will be protected by appropriate cover strips. After the filling of the bag, the cover strips will be removed, and the binding and sealing strip 16 will be folded around the mouth of the bag. This binding strip will likewise have been coated, preferably over one entire surface, with a layer of the adhesive substance, and if it has been protected with a protective cover strip, such cover strip will be removed. It is characteristic of rubber latex, however, that while the initially aqueous emulsion will wet the paper surface so that after setting up, the adhesive will be found securely affixed thereto, the set up adhesive does not tend to adhere to paper. Thus, it is possible to coat a continuous paper strip with latex and dry the coating in place, after which it is possible to wind the strip into a roll without having the paper layers adhere one to another. In such a roll, no protective cover strip need be employed.

After the strip 16 has been bound about the mouth of the bag it will be cut off, leaving an extension of, say a half inch or inch beyond the bag walls at both ends of the strip in order to prevent siftage at the corners. Since the strip has been completely coated, it will adhere to itself at these points. If this is done, it is not necessary that the walls of the bag be coated with a pressure-sensitive adhesive for the full area over which the binding strip is to contact the walls, providing that the walls are sensitized over a sufficient area to provide good adhesion to the folded binding strip.

I have found that by the procedure outlined, employing a minimum of adhesive, I can secure as strong a bond as can be secured with the same adhesive under any circumstances, and I have the advantage of instant adhesion and a complete elimination of drying intervals in the actual seam formation step.

Figure 6:
Fig. 6 is a sectional view illustrating a method of applying adhesive substance to a web, as well as a method of causing webs to adhere one to another.

My procedure likewise enables me to apply to the laminae being joined together, coatings of the adhesive substance much thinner than can otherwise be applied, with good results. In Fig. 6 I have shown a protective strip, indicated at 19, being coated with an adhesive layer 20 by means of a roll 21 turning in a pan 22 of the adhesive. The emulsified rubber or rubber latex will adhere to the protective strip 19, which, in this case, forms a support, and which may then be laid against the body fabric 23 and pressed thereagainst, if desired, by means of pinch rolls 24. In this way a very thin layer of adhesive may be applied, and may be caused to form an excellent bond with the body layer 23, providing it is applied thereagainst before it has set. Moreover, it will dry against the support 19 so as to form, in effect, a continuous film. The surface of this film, when the protective material has been removed as at 19a, will be continuous, and either smooth or corrugated, depending upon the nature of the support 19, but will be in an excellent condition to bond instantly to a layer of adhesive 25 on another layer of material 26. If a comparably thin layer of the adhesive were applied to the body layer 23, (assuming that this body layer were very porous or were a textile fabric) the thin adhesive layer would tend in considerable measure to soak into the pores or interstices of such fabric, and would present only interspaced points for adhesion. The use of a smooth surface protective cover strip, therefore, as the carrier for the initial application of adhesive, permits the use of a thinner layer and insures the presentation of a substantially continuous surface for joining with another layer of material.

My process is likewise applicable to the making of laminated fabrics. The laminae may be coated with adhesive, and with or without the use of protective coverings may be kept until such time as it is desired to produce laminated fabrics, at which time the various laminae may be caused to adhere together over their entire surfaces or over portions of their surfaces, as desired. In this way, paper creped or not, as desired, may be coated with the pressure-sensitive adhesive, and after the adhesive has set, may be wound upon itself and stored. Cloth may likewise be coated with the adhesive, and the paper and fabric joined at any subsequent time. My process may likewise be employed in the production of self-sealing envelopes, folding containers, or the like, or in the application of webs to various objects or articles. Furthermore, otherwise loose liners for containers or bags may be caused, through the practice of my process, to adhere to the bag or container walls over desired areas. Lined bags, or multi-wall bags, can thus be made with the various laminae adhering together at the mouth of the bag. In multi-wall bags, adhering all walls together at the mouth makes possible the use of cemented closures therefor, with the strain distributed to the various walls. Self-sealing closures may also be formed in slack top inner liners, or in loose liners in bags or containers, separately from the outer closure.

Figure 7:
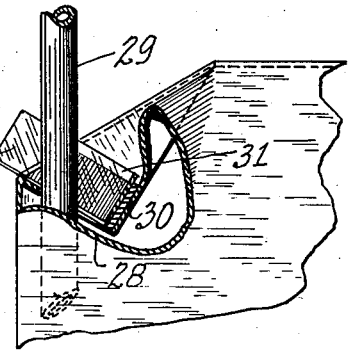
Fig. 7 is a partial elevation of a valve bag to which my invention is applied.

In Fig. 7, I have shown a valve bag having the body 27 and the usual tucked-in valve 28. Such a bag may be filled by the filling spout 29 inserted through the valve. In the application of my invention to this bag, the valve walls are coated with adhesive as at 30, the adhesive being covered by the protective strip 31 having projecting ends one of which is indicated at 32. After the filling of the bag and the withdrawal of the spout 29, the covering strip 31 is peeled away and the valve walls pressed together, giving a tight and if desired, a sift-proof and impervious closure.

By "lapping" in these specifications and claims I do not refer to any particular joint or seam construction, but merely mean to indicate a bringing of treated portions into face-to-face relationship whether strain on the resultant structure would produce a shearing or a peeling pull, and by "seam" I mean to include also junctures of materials to form laminated structures.

Having thus described my invention, what I claim as new and desire to secure by Letters Patent, is:—

1. A container having portions adapted to be lapped and adhesively secured one to another in forming a closure seam, each of said portions being coated with a layer of adhesive which is adapted to form a quick bond with another body of adhesive of the same general class, but is relatively non-adhesive to other substances, and a protective covering of sheet material disposed over said adhesive-coated portions, said sheet material being divided to permit the introduction of contents into said container, and being readily removable from said adhesive layers.

2. A process for seam formation, which comprises arranging articles with portions thereof which are to be lapped and adhesively secured together in an exposed position, coating said exposed portions with an emulsion of rubbery material, covering said exposed portions with a covering of protective sheet material, severing said covering to permit separation of said articles, and when said adhesive substance has set, removing said protective covering, lapping said portions of said articles, and pressing them together.

3. A process of forming seams in bags, which comprises arranging bags in overlapping formation so that only such portions of said bags as are to be lapped and adhesively secured together are exposed, coating the exposed portions of said bags with an emulsion of rubbery substance, applying to said coated portions a protective covering of sheet material, severing said sheet material so that said bags may be separated, severing said sheet material so as to permit access to the interior portions of said bags, and afterward removing said sheet material, lapping said portions, and pressing them together after said adhesive substance has set.

4. A process of preparing bags for the formation of autogenously sealed seams, which comprises providing bags in which portions to be brought together and sealed in forming a top closure are exposed upon one side thereof, arranging a plurality of said bags in overlapping formation so that only such mentioned portions as are to be lapped and adhesively secured together are exposed, simultaneously coating the exposed portions of said bags with an emulsion of rubbery substance, and applying to said coated portions a protective covering of sheet material so disposed as to cover the coated portions and to permit filling of the bag without removal thereof, and disposing said sheet material so as to project beyond at least one portion of the bag where it may be grasped for easy removal.

5. In a heavy duty bag or like container having portions at the filling opening thereof adapted to be lapped and adhesively secured one to another in forming a closure seam, each of said portions being coated with a layer of rubber derived from a rubber dispersion, which layer is adapted to form an autogenous bond with another body of such rubber but is relatively non-adhesive to other substances, said adhesive layers being so positioned with respect to said filling opening as to provide means for completely sealing said opening, and a protective covering of sheet material disposed over said adhesive coated portions to prevent said portions from being rendered non-adhesive by dust or foreign substances, said material being separable to permit the introduction of contents into said container without removal of said protective covering and being readily removable from said adhesive layers for the purpose of sealing said container.

6. A heavy duty bag or like container as claimed in claim 5, in which the container has a strip of material affixed to it at one side of the filling opening, which strip extends beyond the filling opening and sidewise beyond the edge of the container and is adapted to be folded over onto the opposite side of the container and over onto itself, beyond the said edge, the free surface of said strip and the contiguous portions of the said container being coated with the said adhesive.

7. A heavy duty bag or like container as claimed in claim 5, in which the container has a lip projecting from one side wall beyond the filling opening, and in which the other side wall has projecting portions integral with said lip and adapted to be folded over onto themselves with said lip in forming a closure, said lip, said projections, and the contiguous portions of said other side wall being coated with said adhesive.

8. A heavy duty bag or like container as claimed in claim 5 in which the contiguous portions to be lapped and joined are portions located within the filling opening and continuous thereabout.

9. A heavy duty bag or like container as claimed in claim 5 in which the contiguous portions to be lapped and joined are portions located within the filling opening and continuous thereabout and in which the filling opening comprises an inturned valve.

10. A heavy duty bag or like container as claimed in claim 5 in which the rubber derived from a rubber dispersion contains a maximum of curing agents insufficient to cause said rubber to set up to a condition non-adhesive to itself.

11. A heavy duty bag or like container as claimed in claim 5 in which the container walls present a rough surface characteristic of cloth or creped paper and in which the adhesive coating upon one side of such coating conforms substantially to such rough surface, but on its opposite side conforms to the smooth surface of said protective sheet material, whereby when said protective material is removed, smooth adhesive surfaces are presented for forming a tight closure seam.

WILLIAM WALLACE ROWE.